United States Patent [19]

Keller et al.

[11] Patent Number: 5,138,612
[45] Date of Patent: Aug. 11, 1992

[54] TIME-DIVISION MULTIPLEX TRANSMISSION SYSTEM

[75] Inventors: Hans-Georg Keller; Hans-Jürgen Reumerman, both of Hamburg, Fed. Rep. of Germany

[73] Assignee: U.S. Philips Corporation, New York, N.Y.

[21] Appl. No.: 688,779

[22] Filed: Apr. 18, 1991

[30] Foreign Application Priority Data

Apr. 21, 1990 [DE] Fed. Rep. of Germany ....... 4012768

[51] Int. Cl.$^5$ .............................................. H04J 3/02
[52] U.S. Cl. .................................. 370/60; 370/85.13; 370/94.1; 370/95.2
[58] Field of Search ................. 370/85.13, 85.14, 95.2, 370/60, 94.1, 56

[56] References Cited

U.S. PATENT DOCUMENTS

| 4,771,419 | 9/1988 | Graves et al. | 370/58.3 |
| 4,969,149 | 11/1990 | Killat et al. | 370/60 |
| 5,046,064 | 9/1991 | Suzuki et al. | 370/60 |
| 5,067,124 | 11/1991 | Killat et al. | 370/60 |

Primary Examiner—Douglas W. Olms
Assistant Examiner—Russell W. Blum
Attorney, Agent, or Firm—David R. Treacy

[57] ABSTRACT

An interconnection element for an asynchronous time-division multiplex transmission system which transmits cells supplied by auxiliary lines (14a to 14d) and destined for a trunk line (10). The element comprises cell filters (11a to 11d) coupled each to an auxiliary line. The filters pass the cells to be stored in intersection buffers (12a to 12d) coupled to each cell filter when the path identification is allocated to the trunk line for controlling the reading of the cells from the intersection buffers onto the trunk line the system includes allocation circuit comprises a chain of hierarchically structured allocation elements (13a to 13d) associated each to an intersection buffer and having each its control buffer (17a to 17d). When a cell is stored in the associated intersection buffer each allocation element stores a first status in the associated control buffer and the hierarchically lower allocation element a second status in the associated control buffers. In reverse hierarchical order each allocation element evaluates the associated control buffer and releases, when a first status is available, the allocated intersection buffer for a cell to be read out.

20 Claims, 2 Drawing Sheets

TIME-DIVISION MULTIPLEX TRANSMISSION SYSTEM

CROSS REFERENCE TO RELATED APPLICATION

The invention disclosed herein is related to that disclosed by one of applicants herein, and another, in U.S. patent application Ser. No. 07/674, 492 filed Mar. 25, 1991.

Background of The Invention

The invention relates to an asynchronous time-division multiplex transmission system comprising an interconnection element, which element transmits cells supplied by auxiliary lines and destined for a trunk line, which element includes cell filters coupled each to one auxiliary line, which filters pass the cells to be stored in intersection buffers coupled to each cell filter when the path identification contained in the cells is allocated to an auxiliary line, and which element includes an allocation circuit for controlling the reading out of the cells from the intersection buffers onto the trunk line.

In the asynchronous time-division multiplex transmission system useful information components, for example, telephone, picture or sound signals are transmitted in blocks of a fixed length over digital signal processing arrangements. A cell having a predetermined number of bits in a serial sequence is called a fixed-length block. Each cell consist of a header field and an information field. The header field contains inter alia the path identification for the cell. Path identification should here be understood to mean a connection identification or path routing information. The connection identification comprises the data on the target or subtarget for the useful information. Within the system the path routing information is added in specific transmission arrangements and this information contains data on a subtarget in the transmission arrangement. The useful information is accommodated in the information field.

Certain time intervals (time frames) are allocated to consecutive cells. The duration of such a time interval depends on the clock frequency employed for the transmission components. If no useful information is available, idle cells, i.e. cells without useful information, are transmitted in such time frames.

During the transmission of the cells among subscribers, the cells pass through switching networks in which paths are formed by means of path identification evaluation. Such a switching network is habitually composed of a plurality of switching network blocks. Such a switching network block which has a plurality of auxiliary lines and trunk lines is constituted by a plurality of interconnection elements. An interconnection element is connected to a plurality of auxiliary lines and a trunk line. In an interconnection element cells are passed from an auxiliary line to a trunk line. When cells arrive from a plurality of auxiliary lines during a time frame, which cells wish to access a trunk line, specific interconnection strategies are necessary.

A foresaid time-division multiplex transmission system comprising an interconnection element is disclosed in DE-OS 38 33 490 to which U.S. Pat. No. 5,067,124 corresponds. The cells then occurring on the auxiliary lines are stored in an intersection buffer for each line if a cell filter passes cells to the intersection buffer. In the cell filter the cell is stored in a register and by means of a comparator it is checked on the basis of the cell path identification and the trunk line address stored in the address memory whether the cell is allocated to the trunk line. If the cell is to be passed to the trunk line it is stored in the intersection buffer.

Cells that do not belong to this trunk line are checked in further interconnection elements. If the intersection buffers are released to be read out, they apply cells to the trunk line. Decisions on the order in which the cells are read out are made by an allocation circuit in which the cells, in the order in which they have been written, are released to be read out. If a plurality of cells have arrived simultaneously, they will be read out in a predetermined order. The allocation circuit comprises for each auxiliary line further intersection buffers in which the results of the comparison in the comparator are stored. On the basis of this information the allocation circuit decides on the order in which the cells are read out. The allocation circuit comprises a decision circuit that decides on the order in which the cells are read out. To control the read-out operation, control elements are connected to the decision circuit over the pairs of control lines and allocated to each intersection buffer. With a high number of auxiliary lines also the number of these control lines increases. When an interconnection element is realized on an integrated circuit it is an object to connect to the interconnection element as many auxiliary lines as possible. The number of control lines is then the limiting factor.

SUMMARY OF THE INVENTION

It is an object of the invention to provide an asynchronous time-division multiplex transmission system comprising an interconnection element for an asynchronous time-division multiplex transmission system comprising a different allocation circuit.

According to the invention this object is achieved in a time-division multiplex transmission system comprising an interconnection element of the type mentioned in the preamble, in that the allocation circuit comprises a chain of hierarchically structured allocation elements associated each to an intersection buffer and having each a control buffer, in that each allocation element stores a first status in the associated control buffer when a cell is stored in the associated intersection buffer and the hierarchically lower allocation elements store a second status in the associated control buffers, and in that in reverse hierarchical order each allocation element evaluates the associated control buffer and, when a first status presents itself, releases the associated intersection buffer for a cell to be read out.

In this time-division multiplex transmission system comprising an interconnection element, a supplied cell which is to be conveyed to the trunk line is written into the associated intersection buffer. In the allocation element associated to each intersection buffer and forming a part of an allocation circuit, a first status is produced which is written into a control buffer included in the allocation element. If no cell has arrived for the trunk line, nothing will be stored. The allocation element that has established the arrival of a cell reports this to a further allocation element. This message is sent to the hierarchically lower allocation element which then produces a second status which is stored in its control buffer. This message about the arrival of a cell is passed on to the hierarchically lowest allocation element. Each hierarchically lower element generates its second status which is stored in the respective associated control buffer. If, simultaneously, a cell has been written into a further intersection buffer, the associated allocation circuit also generates a first status for the associated control buffer and a message for the hierarchically lower allocation elements. During this operation first the message from the hierarchically lower lower allocation element passes through the chain of the lower allocation elements and in a distance in time the message of the higher allocation element passes through the same chain of lower allocation elements because, prior to this, other hierarchically higher allocation elements have been passed through. In this case in which two cells have been stored in respective intersection buffers, at least in the control buffer of the lowest allocation element two second statuses are stored during this time frame.

The reading out of a cell is performed in reverse direction. First the hierarchically lowest allocation element evaluates the status produced by its control buffer. What has been written first is read out first from a control buffer. If the allocation circuit establishes that a second status is the oldest status stored in that control buffer, the hierarchically next higher allocation element evaluates the produced status of its control buffer. This is continued until an allocation element in the hierarchically increasing order of all the elements detects a first status in its control buffer. Subsequently, the allocation circuit releases the associated intersection buffer for a cell to be read out. For the next cell to be read out in the next time frame a start is again made at the lowest allocation element. The chain of allocation elements is passed through in hierarchically increasing order until an allocation element detects a first status. The intersection buffer associated to this allocation element will then present a cell to the trunk line.

By means of the time-division multiplex transmission system according to the invention and comprisins an interconnection element, the number of lines between allocation circuit and associated control circuits of the intersection buffers are reduced, compared to the prior-art interconnection element. Irrespective of the number of intersection buffers or auxiliary lines, two lines are necessary each time to report that a cell has arrived and to control a reading operation.

For controlling the reading operation in the time-division multiplex transmission system comprising an interconnection element it is provided that the allocation element having the lowest hierarchical order is released for the evaluation of the associated control buffer by a cell request circuit by means of a release signal at the beginning of a time frame and in that this release signal is passed on in hierarchically increasing order from one allocation element to the next when a second status is established after the associated control buffer has been evaluated. The release signal each time enables an allocation element to evaluate the associated control buffer.

When a cell arrives, a first status is stored in the associated control buffer. In the control buffers of the lower order allocation elements a second status is stored. In order to be in a position to control this storing operation it is provided that except for the hierarchically lowest allocation element an allocation element generates an arrival signal after a first status has been stored in the associated control buffer, which signal is passed on from one allocation element to the next in a hierarchically decreasing order, a second status stored in each control buffer of an allocation element after the arrival of this signal.

In a further embodiment of the invention it is provided that each allocation element comprises a write controller which is informed by the associated cell filter whether a cell destined for the trunk line has arrived and which then writes a first status into the associated control buffer and which, subsequently, after the signal arrives from the higher hierarchy allocation element, writes a second status into the control buffer, and comprises a read controller which is coupled to the control buffer and which releases the associated control buffer to be read out in the case where a release signal and a first status occur. The write controller thus produces for the associated control buffer a first or a second status which is then written in the control buffer. It is possible that more that one second statuses are written into the control buffer. The number of second statuses written into a control buffer during a time frame depends on the number of cells produced in the higher-hierarchy allocation elements. The read-out control releases the associated intersection buffer for a cell to be read out onto the trunk line when, on the one hand, a release signal occurs and on the other a first status from the associated intersection buffer is available.

Furthermore, it is provided that except for the write controller of the allocation element having the lowest hierarchial order, each write controller of an allocation element generates an arrival signal when a cell is stored in the associated intersection buffer and in that the write controllers of the hierarchically lower allocation elements pass the arrival signal after evaluation.

If a read controller of an allocation element receives a release signal, it passes this signal on up to the read controller of the hierarchically highest allocation element when a second status is established after the associated control buffer status that has been read out has been evaluated.

In order to arrange a control buffer in an allocation element in as simple a manner as possible, it is provided that for the first status a binary "one" and for the second status a binary "zero" is written into a control buffer.

An exemplary embodiment of the invention will be further explained hereinbelow with reference to the drawings in which.

The principle of an asynchronous time-division multiplex transmission system can be explained with reference to the block diagram represented in FIG. 1. The signals of a terminal unit, for example, telephone, picture or sound signals, are segmented in a packetiser and provided with a header field which contains a path identification. The path identification comprises the data on the target of the signals. Such a terminal unit and the packetiser form a subscriber terminal unit 1. The data of such a terminal unit are transmitted within consecutive time intervals (time frames) in the form of cells. The duration of such a time frame than depends on the clock frequency used of a transmission component. Such cells consist of the above header field and useful information. If no data are to be transmitted in a time frame, an idle cell is formed, i.e. a cell whose header field contains an indication and no further information is to follow.

Figure 1:
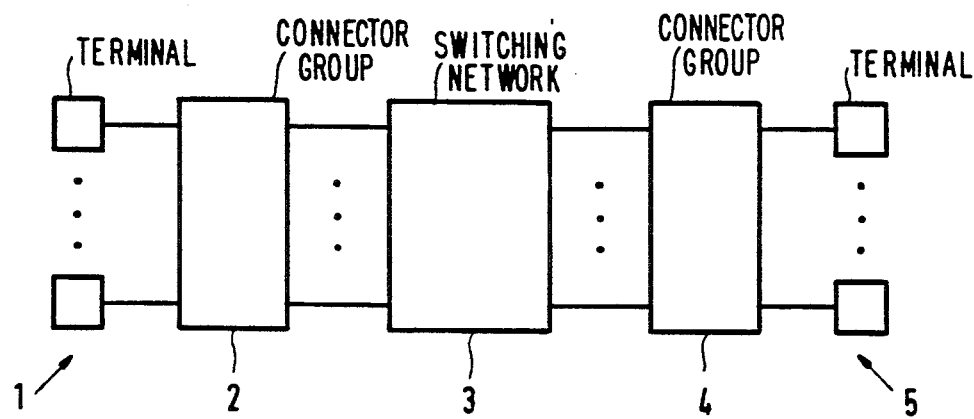
FIG. 1 shows a block diagram of an asynchronous time-division multiplex transmission system.

In the block diagram shown in FIG. 1, the data of, for example, 64 subscriber terminal units 1 are transmitted to a connector group 2, over 64 lines having each a capacity of 150 Mbit/s. The data are combined in the connector group 2 and transmitted over a lower number of lines having a higher capacity. For exmple, these data can be conveyed over 16 lines having each a capacity of 600 Mbit/s. Data switching is effected in a subsequent switching network 3, formed by a plurality of switching network blocks in their turn being fomed by a plurality of interconnection elements, by evaluating the path identification and applying the data to a specific trunk line. In this case an interconnection element consist of a circuit arrangement connected to a plurality of auxiliary lines and to a trunk line. The circuit arrangement can determine data transported over the trunk line linked to the interconnection element, and the interconnection element can create the necessary paths within the circuit arrangement. The switching network 3 has a plurality of lines, for example, 16 lines having a capacity of 600 Mbit/s, connected to a connector group 4. The connector group 4 passes the received data over lines to subscriber terminal units 5. For this purpose, 64 lines are provided having each a capacity of, for example, 150 Mbit/s. Such a system processes the data in a bidirectional manner, i.e. these data are furthermore transmitted from the subscriber terminal unit 5 to the subscriber terminal unit 1.

Figure 2:
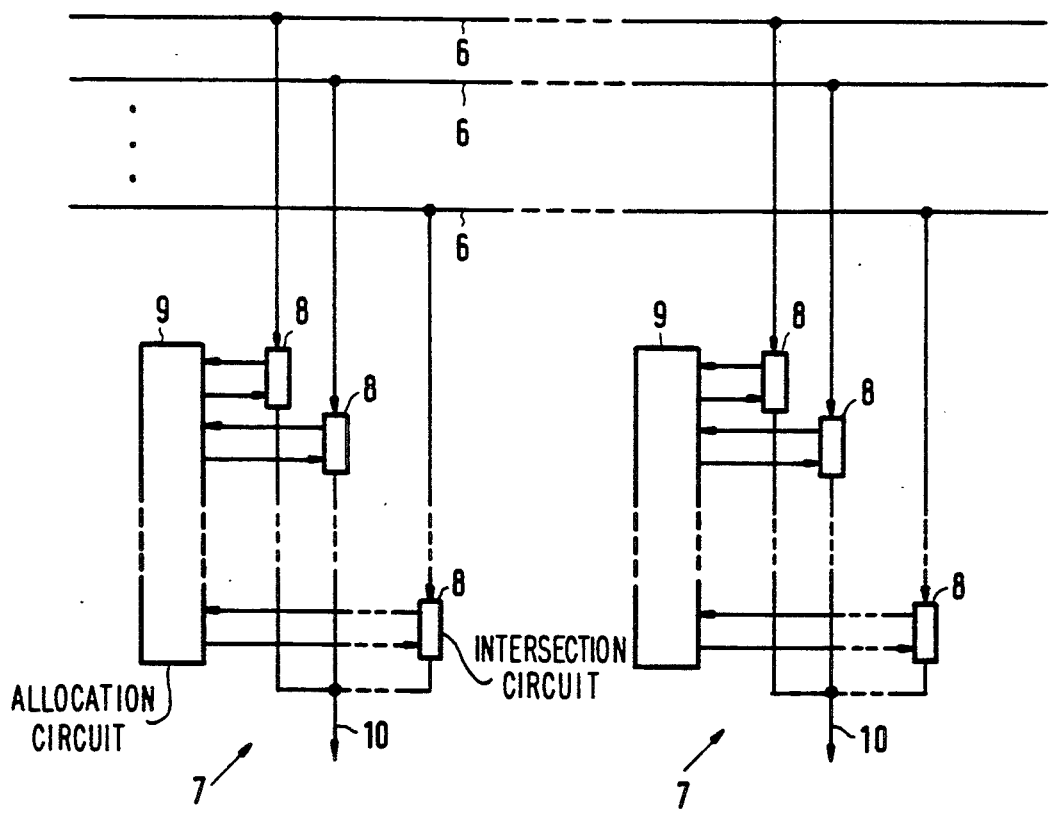
FIG. 2 shows a switching matrix block formed by a plurality of interconnection elements.

FIG. 2 shows a switching network block formed by a plurality of connection elements and which can be part of a switching network. An inerconnection element 7 is connected to a plurality of auxiliary lines 6. Each interconnection element comprises a plurality of intersection circuits 8 which are connected each to an auxiliary line 6. Each intersection circuit 8 comprises an inersection buffer for incoming cells to be stored. The reading process from the intersection buffers on a trunk line 10 is controlled by an allocation circuit 9 in an interconnection element. The allocation circuit 9 controls the order in which the cells are read out from the inersection circuits 8 onto the trunk line 10 so that the cells are read out in the same order as they have been written. In more than one cells have simultaneously arrived over various auxiliary lines, they will be transported to the trunk line in a predetermined order.

Figure 3:
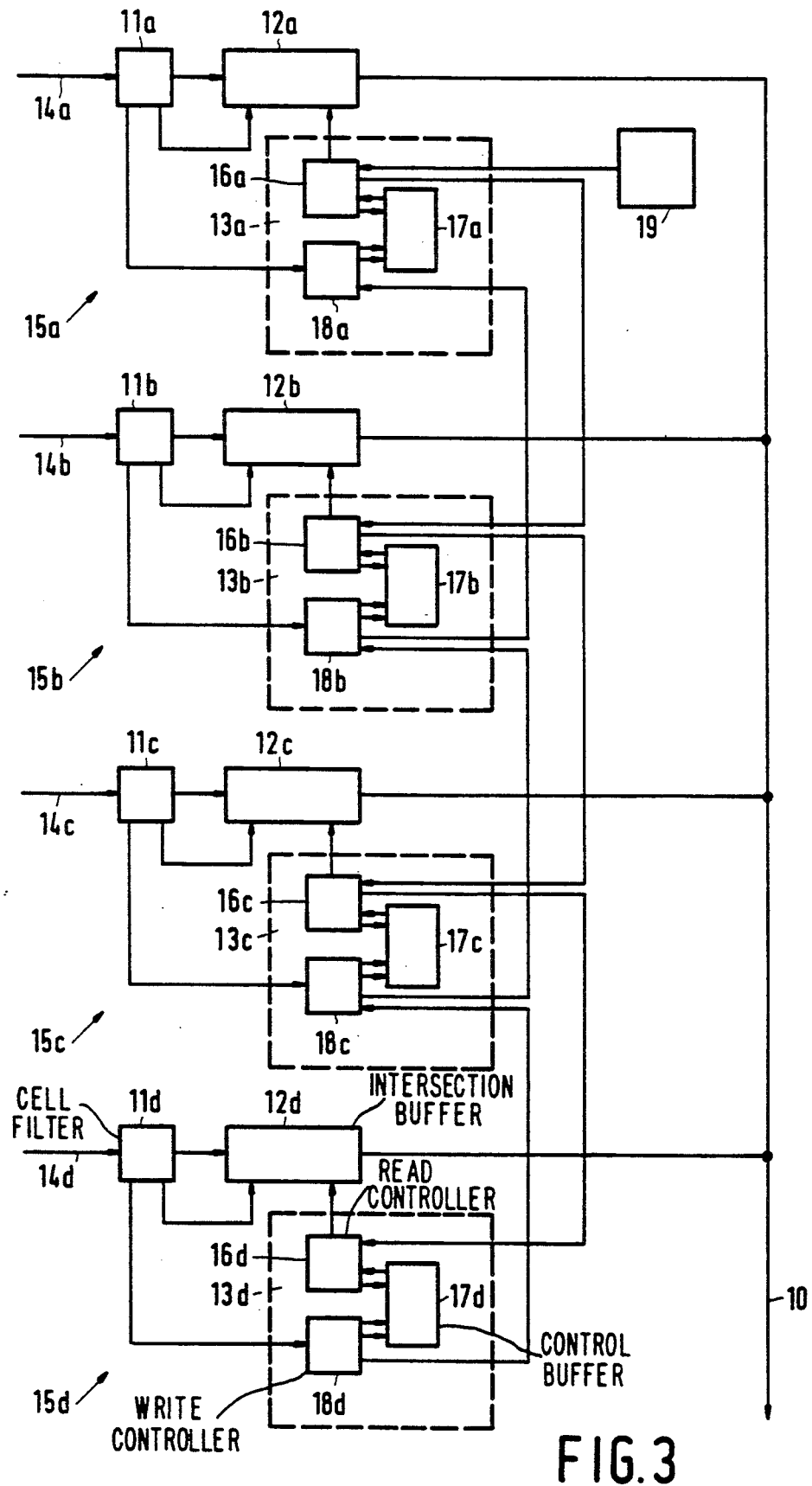
FIG. 3 shows an interconnection element comprising an allocation circuit.

An exemplary embodiment of an interconnection element according to the invention is represented in FIG. 3. This interconnection element comprises four intersection circuits 15a to 15d for simplicity. Such an interconnection element, however, can also comprise more intersection circuits. Each intersection circuit 15a to 15d connected to an auxiliary line 14a to 14d comprises a cell filter 11a to 11d, an intersection buffer 12a to 12d and an allocation element 13a to 13d. The input of each cell filter 11a to 11d is connected to an auxiliary line 14a to 14d. Such a cell filter 11a to 11d checks whether the arriving cell is to be passed on to the trunk line 10. Each cell filter 11a to 11d may comprise, for example, a register, a comparator and a memory. A cell is written into the register. The path identification of the cell stored in the register is transmitted to the comparator over a line and so is information from the memory over a second line. On the basis of the path identification and the information from the memory the comparator determined whether the path identification is allocated to the trunk line 10.

The structure of an intersection circuit 15a to 15d will be explained with reference to the intersection circuit 15b. In the case where the cell arrived at the cell filter 11b is to be written into the intersection buffer 12b connected to the cell filter 11b, a write signal is applied to the intersection buffer 12b over a control line, after which the cell is written into the intersection buffer 12b over a further line. Associated to the intersection buffer 12b is an allocation element 13b which controls over a control line the reading from the intersection buffer 12b. The output of the intersection buffer 12b is connected to the trunk line 10. The further intersection circuits 15a, 15c and 15d have similar structures.

An allocation element 13a to 13d comprises a read controller 16a to 16d, a control buffer 17a to 17d and a write controller 18a to 18d. The structure of the allocation element will explained with reference to the allocation element 13b. The control buffer 17b is connected to the write controller 18b over a data line and a control line and also over a data line and a control line to the read controller 16b. Furthermore, the write controller 18b is connected to a cell filter 11b over a control line.

There is a connection between the write controller 18b and the write controller 18a, a connection between the write controller 18c and the write controller 18b and another controller between the write controller 18d and the write controller 18c. A cell request circuit 19 is connected to the read controller 16a and this read controller to the read controller 16b. Furthermore, there is a connection between the read controllers 16b and 16c and between the read controllers 16c and 16d.

The allocation elements 13a to 13d form an allocation circuit 9. The individual allocation elements 13a to 13d have a hierarchical structure. The allocation element lowest in the hierarchy is the allocation element 13a, whereas allocation element 13d is the element highest in the hierarchy. If a cell arrives at, for example, cell filter 11c which is associated to the trunk line d, the cell filter 11c generates a signal by which the associated write controller 18c is informed that a cell has arrived. The write controller 18c then generates a binary "one" which is written into the control buffer 17c. Furthermore, the write controller 18c generates an arrival signal by which the write controller 18b of the allocation element 13b lower in the hierarchy is informed that a cell has been written into the intersection buffer 12c. Then the write controller 18b generates a binary "zero" which is written into the associated control buffer 17b. The arrival signal is transported by the write controller 18b to the write controller 18a which also generates a binary "zero" which "zero" is written into the associated control buffer 17a.

Upon the arrival of a cell at an intersection buffer 12a to 12d, a binary "one" is written into the associated control buffers 17a to 17d and in the lower-hierarchy allocation elements 13a to 13c a binary "zero" is written into the associated control buffers 17a to 17c. If a cell that is to arrive at the trunk line 10, is found on the auxiliary line 14a, only a binary "one" is produced for the control buffer 17a.

The reading of a cell from an intersection buffer 12a to 12d is controlled in the following manner: at the beginning of a time frame the cell request circuit 19 generates a release signal which is applied to the read controller 16a. The read controller 16a checks which status is first available in the controller buffer 17a. If the read controller 16a established that a binay "one" has been stored in the control buffer 17a, a read signal for the intersection buffer 12a is produced by the read controller 16a. Then, a cell stored in the intersection buffer 12a is conveyed to the trunk line 10. If a binary "zero" has been stored in the control buffer 17a, the read controller 16a applies the release signal to the read controller 16b of the higher hierarchy allocation element 13b. At this point there is a check whether a binary "one" or a binary "zero" is available in the associated control buffer 17b. If a binary "one" is available, a cell from the intersection buffer 12b is produced by means of a read signal of the read controller 16b. If a binary "zero" is available in the control buffer 17b, the release signal is conveyed to the allocation element 13c. This chain is passed through up to the last allocation element 13d. Reading the cells from a control buffer 12a to 12c is then to be delayed, for example, by means of delay not represented any further or by means of an appropriate controller for the read-out of the control buffers 12a to 12c. As a result of the evaluation of the release signal in the read controllers 16b to 16d delays will occur so that cell superpositions may arise when no delay is anticipated for the reading operation.

In the following an example will be explained of how the control buffers 17a to 17d are filled when the cells arrive over various auxiliary lines 14a to 14d. For example, if in a first time frame, a cell which is allocated to the trunk line 10 arrives over the auxiliary line 14a, only the write controller 18a will produce a binary "one" which is stored in the control bufer 17a. It is to be assumed that in a second time frame a cell arrives on the auxiliary line 14d which cell is stored in the intersection buffer 12d. The write controller 18d produces a binary "one" which is stored in the control buffer 17d. Furthermore, the write controller 18d will produce an arrival signal which is transported to the write controller 18a by means of the write controller 18c. Each write controller 18a to 18c produces in response to the capturing of the arrival signal a binary "zero" to be stored in the control buffer 17a to 17c. In a third time frame the cells allocated to the trunk line 10 are to occur on the auxiliary lines 14a, 14b and 14d. In the control buffers 17a, 17b and 17d a binary "one" will then be stored. An arrival signal is conveyed by the write controller 18b to the write controller 18a which, thereafter, writes a binary "zero" into the controller buffer 17a. Furthermore, the write controller 18d produces an arrival signal as a result as a result of which a binary "zero" is written into the control buffers 17a to 17c. In a fourth time frame, for example, a cell arrives over the auxiliary line 14c. Thereafter, a binary "one" will be written into the control buffer 17c and a binary "zero" into the control buffers 17a and 17b. Finally, it is to be assumed that during a fifth time frame a cell arrives only over the auxiliary line 14a. Then a binary "one" which is written into the control buffer 17a will be generated by the write controller 18a.

If thus far not a single cell has yet been read out, the binary statuses "1010001" are stored in the control buffer 17a, the binary statuses "0100" in the control buffer 17b, the binary statuses "001" in the control buffer 17c and the binary statuses "11" in the control buffer 17d.

During the reading operation, after the cell request circuit 19 has applied a release signal to the read controller 16a, there is a check which status is available first in the control buffer 17a. The read controller 16a establishes that a binary "one" has been stored in the control buffer 17a. Then the cell arrived in the first time frame is conveyed to the trunk line from the intersection buffer 12a. In the next time frame, after the release signal has been transmitted by the cell request circuit 19, it is established in the read controller 16a that a binary "zero" is available next in the control buffer 17a. Thereafter, the releases signal is applied to the read controller 16b of the higher-hierarchy allocation element. Here too it is established that a binary "zero" has been stored first in the control buffer 17b. The same is established by the read controller 16c which then conveys the release signal to the read controller 16d. It is now established that in the control buffer 17d a binary "one" is available, after which the cell arrived over the auxiliary line 14d in a second time frame is applied to the trunk is line 10. In the next time frame it is established by the read controller 16a that a binary "one" is available next in the control buffer 17a, after which the cell arrived over the auxiliary line 14a in the third time frame is applied to the trunk line 10. In the next time frame it is established by the read controller 16a that in the control buffer 17a a binary "zero" is available next and then by the read controller 16b that in the assocaited control buffer 17b a binary "one" is available and that the next cell is transmitted from the intersection buffer 12b. In the next time frames the read controllers 16a, 16b and 16c establish that in their control buffers 17a to 17c binary "zeroes" are available. The release signal thus reaches the read controller 16d which establishes that in the associated control buffer 17d a binary "one" is available. Then the cell arrived over the auxiliary line 14d in the third time frame is transported to the trunk line 10. During the next time frames the cells then stored in the intersection buffers 12c and 12a are transported to the trunk line 10.

It should further be observed that the lines represented in the drawing Figures are shown in the form of one line for clarity, although they usually consist of a plurality of parallel lines. Also the clock lines and generators necessary for controlling the individual digital circuitry elements have not been represented.

We claim:

1. An asynchronous time-division multiplex transmission system, comprising a plurality of auxiliary lines, a trunk line, and an interconnection element for transmitting cells from resepctive auxiliary lines and destined for said trunk line, where each cell contains path identification information, said element including a corresponding plurality of cell filters each coupled to a respective auxiliary line; a corresponding plurality of intersection buffers each coupled to a respective cell filter; and an allocation circuit;

each cell filter comprising means for determining if the path identification, contained in a cell received on the auxiliary line coupled thereto, is allocated to said trunk line, and then passing a cell so allocated to be stored in the corresponding intersection buffer; and said allocation circuit controlling reading out of the cells from the intersection buffers onto the trunk line, characterized in that the allocation circuit comprises a chain of hierarchically structured allocation elements, each allocation element being associated with a respective intersection buffer and comprising a respective control buffer, each allocation element comprises means for storing a first status in the respective control buffer when a cell is stored in the associated intersection buffer;

the allocation circuit comprises means for storing, in the respective control buffers of the hierarchically lower allocation elements, a respective second status for each first status stored in a respective hierarchically higher allocation element, and the allocation circuit further comprises means for evaluating the associated control buffer of each allocation element in reverse hierarchical order and, responsive to said associated control buffers having a first status stored therein, releasing the associated intersection buffer for reading out a cell stored therein.

2. A system as claimed in claim 1, characterized in that each allocation element stores a binary "one" in the associated control buffer to define said first status; and stores a binary "zero" in said associated control buffer to define said second status.

3. A system as claimed in claim 1, characterized in that each allocation element except for the hierarchically lowest allocation element comprises means for generating an arrival signal after a first status has been stored in the associated control buffer, said arrival signal being passed from one allocation element to the next in a hierarchically decreasing order; and the means for storing said respective second status in the corresponding control buffer of each hierarchically lower allocation element stores such status after the arrival signal has been passed to said hierarchically lower allocation element.

4. An asynchronous time-division multiplex transmission system, comprising a plurality of auxiliary lines, a trunk line, and an interconnection element for transmitting cells from respective auxiliary lines and destined for said trunk line, where each cell contains path identification information, said element including a corresponding plurality of cell filters each coupled to a respective auxiliary line; a corresponding plurality of intersection buffers each coupled to a respective cell filter; and an allocation circuit;

each cell filter comprising means for determining if the path identification, contained in a cell received on the auxiliary line coupled thereto, is allocated to said trunk line, and then passing a cell so allocated to be stored in the corresponding intersection buffer; and said allocation circuit controlling reading out of the cells from the intersection buffers onto the trunk line, characterized in that the allocation circuit comprises a chain of hierarchically structured allocation elements, each allocation element being associated with a respective intersection buffer and comprising a respective control buffer, each allocation element comprises means for storing a first status in the respective control buffer when a cell is stored in the associated intersection buffer; and the allocation circuit comprises:

means for storing in the respective control buffers of the hierarchically lower allocation elements, a respective second status for each first status stored in a respective hierarchically higher allocation element, a cell request circuit for producing a release signal at the beginning of a time frame, the allocation element having the lowest hierarchical order being released by said release signal for evaluation of its associated control buffer and, responsive to said associated control buffer having a first status as the oldest status stored therein, releasing the associated intersection buffer for reading out a cell stored therein; and means for passing on said release signal from one allocation element to the next in hierarchically increasing order after the associated control buffer has been evaluated and a second status read out as the oldest status stored in the associated control buffer.

5. A system as claimed in claim 4, characterized in that each allocation element stores a binary "one" in the associated control buffer to define said first status; and stores a binary "zero" in said associated control buffer to define said second status.

6. A system as claimed in claim 4, characterized in that each allocation element except for the hierarchically lowest allocation element comprises means for generating an arrival signal after a first status has been stored in the associated control buffer, said arrival signal being passed from one allocation element to the next in a hierarchically decreasing order; and the means for storing said respective second status in the corresponding control buffer of said next allocation element stores such status after the arrival signal has been passed to said next allocation element.

7. A system as claimed in claim 6, characterized in that each allocation element stores a binary "one" in the associated control buffer to define said first status; and stores a binary "zero" in said associated control buffer to define said second status.

8. An asynchronous time-division multiplex transmission system, comprising a plurality of auxiliary lines, a trunk line, and an interconnection element for transmitting cells from respective auxiliary lines and destined for said trunk line, where each cell contains path identification information, said element including a corresponding plurality of cell filters each coupled to a respective auxiliary line; a corresponding plurality of intersection buffers each coupled to a respective cell filter; and an allocation circuit;

each cell filter comprising means for determining if the path identification, contained in a cell received on the auxiliary line coupled thereto, is allocated to said trunk line, and then passing a cell so allocated to be stored in the corresponding intersection buffer; and said allocation circuit controlling reading out of the cells from the intersection buffers onto the trunk line, characterized in that the allocation circuit comprises a chain of hierarchically structured allocation elements, each allocation element being associated with a respective intersection buffer and comprising a respective control buffer, each allocation element comprises a write controller and a read controller, said write controller writing a first status into the respective control buffer of that allocation element when the associated cell filter signals that a cell destined for said trunk line has arrived, each allocation element except for the hierarchically lowest allocation element comprises means for generating an arrival signal after a first status has been stored in the associated control buffer, said arrival signal being passed from one allocation element to the next in a hierarchically decreasing order, each write controller writes a second status into the control buffer after the arrival signal arrives from the higher hierarchy allocation element, thereby storing a respective second status for each first status stored in a respective hierarchically higher allocation element, the allocation circuit further comprises a cell request circuit for producing a release signal at the beginning of a time frame, the allocation element having the lowest hierarchical order being released by said release signal for evaluation of its associated control buffer and, responsive to said associated control buffer having a first status as the oldest status stored therein, releasing the associated intersection buffer for reading out a cell stored therein; and means for passing on said release signal from one allocation element to the next in hierarchically increasing order after the associated control buffer has been evaluated and a second status read out as the oldest status stored in the associated control buffer, and each read controller is coupled to the respective control buffer for releasing the associated intersection buffer for read out responsive to receipt of a release signal from a lower hierarchical allocation element and read out of a first status as the oldest status stored in the respective control buffer of said each read controller.

9. A system as claimed in claim 8, characterized in that each allocation element stores a binary "one" in the associated control buffer to define said first status; and stores a binary "zero" in said associated control buffer to define said second status.

10. A system as claimed in claim 8, characterized in that, except for the write controller of the allocation element having the lowest hierarchical order, said means for generating an arrival signal when a cell is stored in the associated intersection buffer comprises the respective write controller; and that after generating a respective arrival signal responsive to storage of a respective cell in the respective associated intersection buffer, the write controllers of the hierarchically lower allocation elements pass on the arrival signal in hierarchically decreasing order.

11. A system as claimed in claim 10, characterized in that, except for the read controller of the hierarchically highest allocation element, after receipt of a release signal, each read controller passes the release signal in a hierarchically increasing order responsive to reading out a second status signal from said buffer.

12. A system as claimed in claim 10, characterized in that each allocation element stores a binary "one" in the associated control buffer to define said first status; and stores a binary "zero" in said associated control buffer to define said second status.

13. An interconnection element for use in an asynchronous time-division multiplex transmission system which comprises a plurality of auxiliary lines, and a trunk line, said element transmitting cells from respective auxiliary lines and destined for said trunk line, where each cell contains path identification information, said element including a corresponding plurality of cell filters each coupled to a respective auxiliary line; a corresponding plurality of intersection buffers each coupled to a respective cell filter; and an allocation circuit; each cell filter comprising means for determining if the path identification, contained in a cell received on the auxiliary line coupled thereto, is allocated to said trunk line, and then passing a cell so allocated to be stored in the corresponding intersection buffer; said allocation circuit controlling reading out of the cells from the intersection buffers onto the trunk line, characterized in that the allocation circuit comprises a chain of hierarchically structured allocation elements, each allocation element being associated with a respective intersection buffer and comprising a respective control buffer, each allocation element comprises means for storing a first status in the respective control buffer when a cell is stored in the associated intersection buffer;

the allocation circuit comprises means for storing, in the respective control buffers of the hierarchically lower allocation elements, a respective second status for each first status stored in a respective hierarchically higher allocation element, and the allocation circuit further comprises means for evaluating the associated control buffer of each allocation element in reverse hierarchical order and, responsive to said associated control buffer having a first status read out therefrom, releasing the associated intersection buffer for reading out a cell stored therein.

14. An interconnection element as claimed in claim 13, characterized in that each allocation element stores a binary "one" in the associated control buffer to define said first status; and stores a binary "zero" in said associated control buffer to define said second status.

15. An interconnection element as claimed in claim 13, characterized in that each allocation element except for the hierarchically lowest allocation element comprises means for generating an arrival signal after a first status has been stored in the associated control buffer, said arrival signal being passed from one allocation element to the next in a hierarchically decreasing order; and the means for storing said second status in the corresponding control buffer of a hierarchically lower allocation element stores such status after the arrival signal has been passed to said hierarchically lower allocation element.

16. An element as claimed in claim 13, characterized in that said means for evaluating comprises:

a cell request circuit for producing a release signal at the beginning of a time frame, the allocation element having the lowest hierarchical order being released by said release signal for evaluation of its associated control buffer and, responsive to said associated control buffer having a first status stored therein, releasing the associated intersection buffer for reading out a cell stored therein; and means for passing on said release signal from one allocation element to the next in hierarchically increasing order after the associated control buffer has been evaluated and a second status read out from the associated control buffer.

17. An interconnection element as claimed in claim 16, characterized in that each allocation element except for the hierarchically lowest allocation element comprises means for generating an arrival signal after a first status has been stored in the associated control buffer, said arrival signal being passed from one allocation element to the next in a hierarchically decreasing order; and the means for storing said second status in the corresponding control buffer of a hierarchically lower allocation element stores such status after the arrival signal has been passed to said hierarchically lower allocation element.

18. An interconnection element as claimed in claim 17, characterized in that each allocation element comprises a write controller and a read controller, said write controller writing a first status into the associated control buffer when an associated cell filter signals that a cell destined for said trunk line has arrived, and subsequently writing the second status into the control buffer after an arrival signal arrives from the higher hierarchy allocation element; and said read controller being coupled to the respective control buffer for releasing the associated intersection buffer for read out responsive to receipt of a release signal from a lower hierarchical allocation element and readout of a first status in the respective control buffer.

19. An interconnection element as claimed in claim 18, characterized in that, except for the write controller of the allocation element having the lowest hierarchical order, said means for generating an arrival signal when a cell is stored in the associated intersection buffer comprises the respective write controller; and that after generating a respective arrival signal responsive to storing of a respective cell in the respective associated intersection buffer, the write controllers of the hierarchically lower allocation elements pass on the arrival signal in hierarchically decreasing order.

20. An interconnection element as claimed in claim 19, characterized in that, except for the read controller of the hierarchically highest allocation element, after receipt of a release signal, each read controller passes the release signal in a hierarchically increasing order responsive to reading out a second status signal from said buffer.

* * * * *